United States Patent Office 3,261,473
Patented July 19, 1966

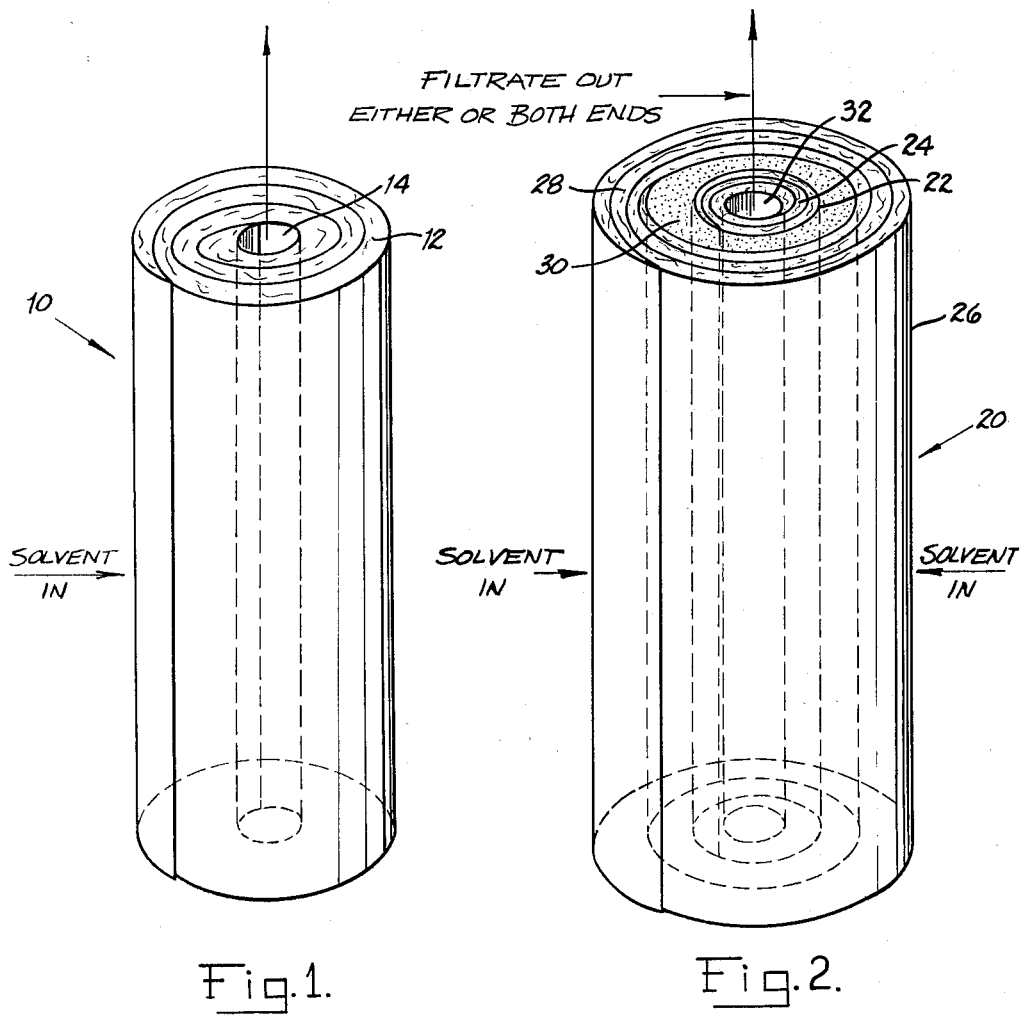

3,261,473
GLASS FIBER CARTRIDGE FILTERS FOR DRY-CLEANING SOLVENT FILTRATION
Raymond G. Riede, Martinsville, N.J., assignor to Johns-Manville Corporation, New York, N.Y., a corporation of New York
Filed Feb. 12, 1964, Ser. No. 344,377
2 Claims. (Cl. 210—282)

This invention relates to glass fiber tubes and cylinders. More particularly, this invention relates to comparatively rigid glass fiber articles of tubular and cylindrical shape that are suitable for use as cartridge filters and especially for drycleaning solvent filtration.

In filtration of drycleaning solvents, it is necessary to remove particulate matter in addition to color and other soluble soils such as fatty acids, oils, and other objectionable non-volatiles. Recently, coin-operated drycleaning has been established and in many instances there is only nominal supervision of the apparatus. It is therefore important that filtering media for the solvents used be efficient and trouble free since the solvents are costly and must be reused for profitable operation. The media must be easy to handle and to replace in order to avoid costly shutdown.

Generally, the filter media have ranged from those similar to those used in regular drycleaning equipment, e.g., in the form of powders such as diatomaceous silica, to the more recent use of cartridge filters. While the industry acknowledges diatomaceous silica filtration as superior both as to clarifying ability and filtration efficiency, it has, however, largely for convenience sake, turned to cartridges in some applications. The major advantage of cartridge filters over powdered media is in the ease of operation, since no filter powder need be handled and there is no filter sludge to discard.

Drycleaning filter cartridges currently on the market include those using fluted paper as the filtering septum. In some cases theses filters are given necessary structural rigidity by using costly metal supporting members. The simplest type of cartridge consists solely of the fluted paper and is capable only of removing particulate matter from the solvent. A more complex type of cartridge provides adsorbents such as carbon to remove color from the solvent. These structures, however, may collapse as a result of filter pressure differential, and consequently, it has been considered necessary to provide rigid supports as part of the unit upon which the filter media may be mounted. This construction requires additional labor and parts which adds to the cost of the cartridges.

Moreover, the paper units when used alone provide only surface filtration and do not remove soluble soils from the solvent. Thus, when using prior art filter cartridges, it has been necessary to replace units often.

Another disadvantage of the prior art filtration cartridges has been the difficulty in controlling the porosity of the filter media in order to insure effective and yet efficient filtration. That is, if the product is too porous it will not function effectively to remove all that it should, but if it is not sufficiently porous, it will not function efficiently as it will build high filtration pressures.

The art, faced with these problems, has sought to provide a more economical filter cartridge and one which will still satisfy the functional requirements outlined above.

It is therefore a primary object of the present invention to provide new and inexpensive filter tubes and cylinders which are suitable for filtration of drycleaning solvents.

It is another object of the present invention to provide a method of producing filter tubes and cylinders of improved physical and filtration characteristics.

It is still another object of the present invention to provide filter tubes which are simple and inexpensive to fabricate.

It is a further object of the present invention to provide filter tubes of controlled porosity and strength.

A still further object of the present invention is to provide filter tubes for use in cartridge filters which are easy to handle and simple to replace.

Still another object of the present invention is to provide filter tubes which may be used without metal reinforcing parts, and which will remove soluble soils from drycleaning solvents.

Still further objects and the entire scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

It has been found that the above objects may be attained by providing a tube or cylinder formed from layers of glass fibers, which layers and fibers are controlled as to mat density and filter diameter in order to assure proper porosity and filtration characteristics. The tube is formed by winding a mat of resin impregnated glass fibers upon a mandrel, the number of convolutions depending upon the wall thickness and strength desired in the finished article. It is to be understod that other treatment of the fibers to provide the necessary rigidity may be employed. The fibers may be combined with granular adsorbents or conditioners to aid in removing soluble soils from the liquid being filtered.

Glass fiber medium is ideal for use as filtration media and is preferred over prior art construction utilizing cellulose, cotton or powders due to its relative inertness and stability over wide ranges of temperature and humidity and the ease in controlling fiber diameters and, therefore, the porosity and resulting density of the medium.

The invention will be more fully understood by reference to the accompanying drawing wherein:

FIGURE 1 is a perspective view of a fiber glass tube according to one embodiment of the present invention, and FIGURE 2 is a perspective view of a fiber glass tube according to another embodiment of the present invention.

Referring now to the drawings wherein like parts bear like numerical designations, and more particularly to FIGURE 1, there is shown a tube, 10, comprising a number of convolutions of a mineral fiber mat, such as fiber glass mat 12. Tube 10 is preferably produced by winding mat 12 around a mandrel. Prior to winding, the mat is impregnated with an uncured thermosetting resin, e.g., phenolic resin, and after the tube is formed it is treated, e.g., heated, to cure the resin.

The mineral fibers, and more specifically the glass fibers, involved in the products and methods of this invention are commonly of a diameter between 0.00010 and 0.00015 inch but may have diameters in the range between 0.00001 and 0.000040 inch. These fibers are produced by well recognized and established processes utilizing high pressure and temperature gas streams to attenuate streams of molten glass. As these fibers, in various lengths, but seldom greater than several inches, drop away from the forming area they are coated with a binder material such as by spraying.

The coated fibers fall or are otherwise discharged upon a moving conveyor and accumulate thereon in a depth usually in the range of one to six inches, dependent upon the final thickness desired, which is controlled both by the speed of the conveyor and the rate of fiber production. The thus formed, resin-impregnated mat is conveyed to a wrapping station wherein the mat is wrapped under tension about a mandrel to the desired tube wall thickness and mat density and porosity. The trailing end of the mat is then cut from the tube, and the tube passed to a curing station wherein heat and pressure are applied to set the binder and fix the dimensions of the tube.

It is possible to use as the bonding agents in the fibrous mat many thermosetting resins including phenolic, urea, silicone, melamine, and alkyd resins. The amount of binder included in the mat may range from 6 to 30% by weight and preferably from 8 to 12% by weight of the glass fibers and is used to bind the fibers at their intersections.

In one embodiment, according to FIGURE 1, the porosity of mat 12 is uniform throughout the thickness of the tube. The mat has a density of about 4 lbs./cu. ft., and is composed of fibers having an average diameter between 0.00010 and 0.00015 inch. The uniform pore openings may have a pore diameter size of from about 5 to 50 microns. Alternatively, the porosity of mat 12 may vary from being relatively dense at the inner diameter of tube 10 to relatively open at the outer diameter. In this instance, pore diameter size may range up to 100 microns near the outer surface. In another embodiment according to FIGURE 1, during formation of tube 10 on the mandrel, granular or powdered adsorbents and conditioners such as carbon or mixtures of carbon with other conditioners such as calcium silicates sold under the trademark Micro-cel and synthetic silicate sweeteners sold under the trademark Hysweet may be added in such a manner as to be layered between convolutions of mat 12. The conditioner may be powdered or granulated and particle sizes between those which will pass a 10 mesh screen and be retained on a 325 mesh screen are suitable. The conditioner may be present in amounts from 5 to 50% by weight of the tube.

After formation, tube 10 is sealed at both ends and when in use, as shown in the drawing, the contaminated solvent enters the filter cartridge through the wall thereof and the filtrate is discharged through opening 14 at either or both ends.

Referring again to the drawing, and more particularly to FIGURE 2, the numeral 20 refers to a filter cartridge according to the present invention that is especially suited for the filtration of drycleaning solvents. Cartridge 20 comprises an inner tubular member 22 formed of a plurality of convolutions of fiber glass mat 24 preferably made in the same manner as tube 10. There is also included in cartridge 20 a spaced outer tubular member 26 formed of a plurality of convolutions of fiber glass mat 28 which may also be made in the same manner. Mats 24 and 28 are impregnated with an uncured thermosetting resin prior to winding on the mandrel.

The porosities of mats 24 and 28 may be uniform throughout or may be varied as described above with regard to tube 10. Moreover, the porosities may be dissimilar, e.g., the pore diameter size of mat 24 may range from about 5 to about 50 microns, and the pore diameter of mat 28 may range from about 10 to about 100 microns. The porosity may be varied by altering the density of the mat during winding or by variable spring tension or compression rolls.

The outer diameter of tube 22 is smaller than the inner diameter of tube 26, and when assembled, tube 22 is placed substantially concentrically of tube 26.

The annular space between the tubes is then filled with a particulate conditioner 30, e.g., granular or powdered charcoal, calcium silicate, or sweeteners of a size range similar to that used in tube 10. Tubes 22 and 26 are sealed at both ends and the contaminated solvent enters cartridge 20 through the outer surface of tube 26, and the filtrate is discharged through opening 32 at either or both ends.

In the embodiments shown in both FIGURES 1 and 2, the tubes formed may be heat cured as soon as formed. When forming cartridge 20, tubes 22 and 26 may be formed and assembled with conditioner 30 and then heat cured as a unit, thereby forming a substantially rigid article.

As noted above, glass fibers used in forming mats 12, 24 and 28 may have diameters ranging from very fine to comparatively coarse such as "AA" fibers having an average diameter of from 0.00001 to 0.00004 inch and "B" fibers having an average diameter of from 0.00010 to 0.00015 inch respectively. Tubes according to the present invention for use as filters for drycleaning solvent are usually manufactured in wall thicknesses between ½ and 3 inches, although other thicknesses are possible. The mat density may range from about 2 to about 10 lbs./cu. ft., with between 5 and 6 lbs./cu. ft. being preferred.

While in the preferred embodiments shown in the drawing and described heretofore, the flow of solvent is from the outer surface of the tube or cartridge to the inner surface thereof, it will be apparent that the direction of flow may be reversed if desired. In this instance the variance in diameters of pore openings will also be reversed, i.e., the larger openings will then be near the inner surface of the tubes and the smaller openings will be near the outer surface of the tube.

Cartridges and tubes according to the present invention are inexpensive and simple to manufacture and are substantially trouble-free in use. The tubes may be constructed without metal members, and greater depth of filtration is achieved than with filters of the prior art; hence, problems due to high filter pressure are reduced or eliminated.

The present invention will thus be seen to accomplish completely and effectively the objects enumerated hereinbefore. It will be realized, however, that various changes and substitutions may be made to specific embodiments disclosed herein for the purpose of illustrating the principles of this invention, without departing from these principles. Therefore, this invention includes all modifications encompassed within the spirit and scope of the following claims.

What I claim is:
1. A porous filter tube, particularly adapted for filtering drycleaning solvent, comprising
   (a) a plurality of convolutions of mineral fiber mat, said mat having a density between about 2 and about 10 pounds per cubic foot and said fibers having diameters between 0.00001 and 0.00040 inch; said fibers being bonded at their intersections with between 6 and 30% by weight of said fibers of thermosetting resin, the intersections of said fibers defining filter pores having diameters in the range between about 5 and about 100 microns, decreasing in size in the direction of the proposed liquid flow; and
   (b) between 5 and 50% by weight of said tube of solid particulate conditioner for said solvent deposited within said mat.
2. A porous filter tube, particularly adapted for filtering drycleaning solvent, comprising
   (a) an inner tubular member comprising a plurality of convolutions of mineral fiber mat, said mat having a density of between about 2 and about 10 pounds per cubic foot, and said fiber having diameters between 0.00001 and 0.00040 inch; said fibers being bonded at their intersections with between 6 and 30% by weight of said fibers of thermosetting resin, the intersection of said fibers defining filter pores having diameters in the range between about 5 and about 100 microns, decreasing in size in the direction of the proposed liquid flow;
   (b) a spaced outer tubular member having characteristics within the ranges defined above in (a);
   (c) solid particulate conditioner for said solvent, filling the space between the inner and outer tubular members; and means for retaining said conditioner in said space.

References Cited by the Examiner

UNITED STATES PATENTS

| 2,141,903 | 12/1938 | Brundage | 210—494 X |
| 2,463,929 | 3/1949 | West | 210—494 X |
| 2,554,814 | 5/1951 | Catlin et al. | 210—491 X |
| 3,061,107 | 10/1962 | Taylor | 210—496 X |
| 3,132,501 | 5/1964 | Jacobs et al. | 210—314 X |

FOREIGN PATENTS

| 827,643 | 2/1960 | Great Britain. |
| 832,890 | 4/1960 | Great Britain. |

REUBEN FRIEDMAN, *Primary Examiner.*

SAMIH ZAHARNA, *Examiner.*